United States Patent
Makishima et al.

(10) Patent No.: US 8,300,243 B2
(45) Date of Patent: Oct. 30, 2012

(54) PRINT SYSTEM AND METHOD OF CONTROLLING OPERATION OF SAME

(75) Inventors: Sugio Makishima, Tokyo (JP); Hiroshi Igarashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1223 days.

(21) Appl. No.: 09/922,869

(22) Filed: Aug. 7, 2001

(65) Prior Publication Data

US 2002/0054337 A1 May 9, 2002

(30) Foreign Application Priority Data

Aug. 9, 2000 (JP) ................................ 2000-240973
Mar. 15, 2001 (JP) .................................. 2001-73426

(51) Int. Cl.
*G06F 3/12* (2006.01)
(52) U.S. Cl. .................... 358/1.15; 358/403; 348/207.2
(58) Field of Classification Search ................. 358/1.15, 358/302; 348/207.2
See application file for complete search history.

(56) References Cited

U.S. PATENT DOCUMENTS

| | | | | |
|---|---|---|---|---|
| 5,697,761 A | * | 12/1997 | Morgan et al. | 414/790.3 |
| 5,913,019 A | * | 6/1999 | Attenberg | 358/1.18 |
| 5,999,945 A | * | 12/1999 | Lahey et al. | 707/200 |
| 6,292,307 B1 | * | 9/2001 | Wu et al. | 359/698 |
| 6,519,048 B1 | * | 2/2003 | Tanaka | 358/1.13 |
| 6,573,927 B2 | * | 6/2003 | Parulski et al. | 348/32 |
| 6,771,896 B2 | * | 8/2004 | Tamura et al. | 396/57 |

FOREIGN PATENT DOCUMENTS

| | | |
|---|---|---|
| JP | 4-311938 | 11/1992 |
| JP | 7-156467 | 6/1995 |
| JP | 7-223345 | 8/1995 |
| JP | 10-224591 | 8/1998 |
| JP | 11-24865 | 1/1999 |
| JP | 11-194909 | 7/1999 |
| JP | 2000-132353 | 5/2000 |
| JP | 2000-137585 | 5/2000 |

* cited by examiner

*Primary Examiner* — Benjamin O Dulaney

(74) *Attorney, Agent, or Firm* — Birch, Stewart, Kolasch & Birch, LLP

(57) ABSTRACT

When an image to be printed is specified in a print system for printing images, a telephone number or e-mail address is entered as a contact destination to be contacted when printing ends. At the conclusion of printing, the entered contact destination is so notified. Upon being so notified of end of printing, the user returns to the location at which the print system has been installed. Since the user will thus know when printing ends, the user can make effective utilization of time until printing ends.

1 Claim, 11 Drawing Sheets

PRINT SYSTEM AND METHOD OF CONTROLLING OPERATION OF SAME

BACKGROUND OF THE INVENTION

1. Field of the Invention

This invention relates to a print system for recording images on a visible recording medium and to a method of controlling the operation of this system.

2. Description of the Related Art

Though printer performance has improved, it still takes a comparatively long time to print an image. In particular, the higher resolution of images makes it even longer to print images. A particularly long period of time is required when a large number of prints are made.

When such images are printed using a printer located in the user's home, the user can complete other tasks while printing is in progress. However, if printing is performed using a printer located in a convenience store or the like, the user must stay near the printer owing to the possibility of theft of the visible medium on which the images are printed. This means that the user cannot leave the printer until printing is finished. In addition, since image printing time is dependent upon image resolution, it is comparatively difficult to predict when printing will end.

DISCLOSURE OF THE INVENTION

Accordingly, an object of the present invention is to make it possible to ascertain how long it will take for printing to end.

Another object of the present invention is to make it possible for the user to leave the printer until printing ends.

According to a first aspect of the present invention, the foregoing objects are attained by providing a print system comprising: an input unit for inputting a contact destination to be contacted at end of printing; a printer for printing an image on a visible recording medium; a first determination unit (first determination means) for determining whether printing by the printer has ended; and a transmitting unit, which is responsive to a determination by the determination unit that printing has ended, for transmitting data indicating that printing has ended to a data processing unit, which is specified by the contact destination that has been input by the input unit, via a communication channel.

The first aspect of the invention provides also an operation control method suited to the above-described system. Specifically, the first aspect of the present invention provides a method of controlling the operation of a print system comprising the steps of: inputting a contact destination to be contacted at end of printing; printing an image on a visible recording medium; determining whether printing has ended; and, in response to a determination that printing has ended, transmitting data indicating that printing has ended to a data processing unit, which is specified by the contact destination that has been input, via a communication channel.

In accordance with the first aspect of the present invention, a destination (e.g., the telephone number of a cellular telephone, the telephone number of an installed telephone, an e-mail address, etc.) to be contacted at the end of printing is entered. When printing of an image on a visible recording medium ends, the data representing the end of printing is transmitted to a data processing unit (cellular telephone, installed telephone, personal computer, digital camera, etc.), which is specified by the entered contact destination, via a communication channel (inclusive of a radio link, wired line or telephone circuit, etc.).

The user ascertains that printing has ended by receiving data transmitted via the communication channel indicating the end of printing. Following the conclusion of printing, the user can go and pick up the visible medium on which printing has been performed. Thus the user is not constrained by the time required for printing to end and can complete other tasks and make effective utilization of time.

In a case where the data processing unit and print system are capable of short-distance communication (e.g., communication based upon Bluetooth technology), the input unit would receive identification data, which identifies the data processing unit, as the contact destination transmitted from the processing unit by short-distance communication. The transmitting unit would transmit the data indicating that printing has ended to the data processing unit, which is identified by the identification data, by short-distance communication.

The system may further comprise an image data receiving unit for receiving image data transmitted from the data processing unit by short-distance communication. In this case the printer would record on the visible recording medium an image represented by the image data received by the image data receiving unit.

Thus, an image represented by image data received by short-distance communication can be printed.

Preferably, the system further comprises a request data receiving unit for receiving data indicating a print extraction request transmitted from the data processing unit by short-distance communication; a second determination unit (second determination means) for determining, in accordance with receipt of the print extraction request data by the request data receiving unit, whether the data processing unit that transmitted the print extraction request data is that of a user authorized to acquire a print; and a printer control unit for ejecting a visible recording medium, on which printing has been performed by the printer, in response to a determination by the second determination unit that the user is authorized.

In a case where print extraction request data has been transmitted from an authorized user to the print system using the data processing unit, the visible recording medium on which printing has been performed is ejected. Thus the authorized user can acquire the visible printing medium on which printing has been performed. If it is determined that the print extraction request is not one from an authorized user, ejection of the visible recording medium that has been printed on is inhibited.

According to a second aspect of the present invention, there is provided a data processing unit that is capable of short-distance communication with the above-described print system. Specifically, a data processing unit according to a second aspect of the present invention comprises a transmitting unit for transmitting identification data, which is for identifying the data processing unit, by short-distance communication to the print system as a contact destination to be contacted at end of printing; a receiving unit for receiving data transmitted by short-distance communication from the print system indicating that printing has ended; and a notification unit for giving notification of end of printing in response to receipt of printing-end data by the receiving unit.

The second aspect of the invention provides also an operation control method for the above-described data processing unit. Specifically, the second aspect of the present invention provides a method of controlling the operation of a data processing unit that is capable of short-distance communication with a print system, comprising the steps of: transmitting identification data, which is for identifying the data processing unit, by short-distance communication to the print system as a contact destination to be contacted at end of printing;

receiving data transmitted by short-distance communication from the print system indicating that printing has ended; and giving notification of end of printing in response to receipt of printing-end data.

Thus, the user is capable of ascertaining end of printing by utilizing short-distance communication.

A print system according to a third aspect of the present invention comprises: a printer for printing an image and an identification code, which is for identifying the owner of the image, on a visible recording medium; a holding mechanism for holding, within the print system, visible recording media on which printing has been performed by the printer; an identification-code notification unit for giving notification of the identification code printed on the visible recording medium by the printer; an identification-code input unit (identification-code reading unit) for inputting the identification code; and an ejection unit for ejecting, from the holding mechanism to the outside of the print system, the visible recording medium on which the input identification code has been recorded from among the visible recording media being held by the holding mechanism.

The third aspect of the invention provides also an operation control method suited to the above-described system. Specifically, the method comprises the steps of: printing an image and an identification code, which is for identifying the owner of the image, on a visible recording medium; holding, within the print system, visible recording media on which printing has been performed; giving notification of the identification code printed on the visible recording medium; inputting the identification code; and ejecting, to the exterior of the print system, the visible recording medium on which the input identification code has been recorded from among the visible recording media being held.

In accordance with the third aspect of the present invention, an image and an identification code (inclusive of a bar code, for example) for identifying the owner of the image are printed on a visible recording medium and the medium on which the printing has been performed is held by a holding mechanism inside the print system. Further, the user is notified of the identification code printed on the visible recording medium. If printing ends and the user enters the identification code of which notification has been given, then, from among visible recording media being held temporarily by the holding mechanism, the visible recording medium on which the entered identification code has been printed is ejected from the holding mechanism. The user is thus capable of receiving the visible recording medium on which an image has been printed.

In accordance with the third aspect of the present invention, the visible recording medium is held by the holding mechanism inside the print system until the user enters the identification code. If the user enters the identification code, then the visible recording medium on which the entered identification code has been recorded is ejected from among the visible recording media being held by the holding mechanism. This means that a third party who does not know the identification code cannot receive the visible recording medium being held inside the print system. Hence there is no danger that a third party will steal a visible recording medium on which an image has been printed. In particular, since the identification code is printed on the visible recording medium, it is possible to utilize this identification code to select and eject the visible recording medium that corresponds to the entered identification code.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described with reference to the drawings.

(1) First Embodiment

Figure 1:
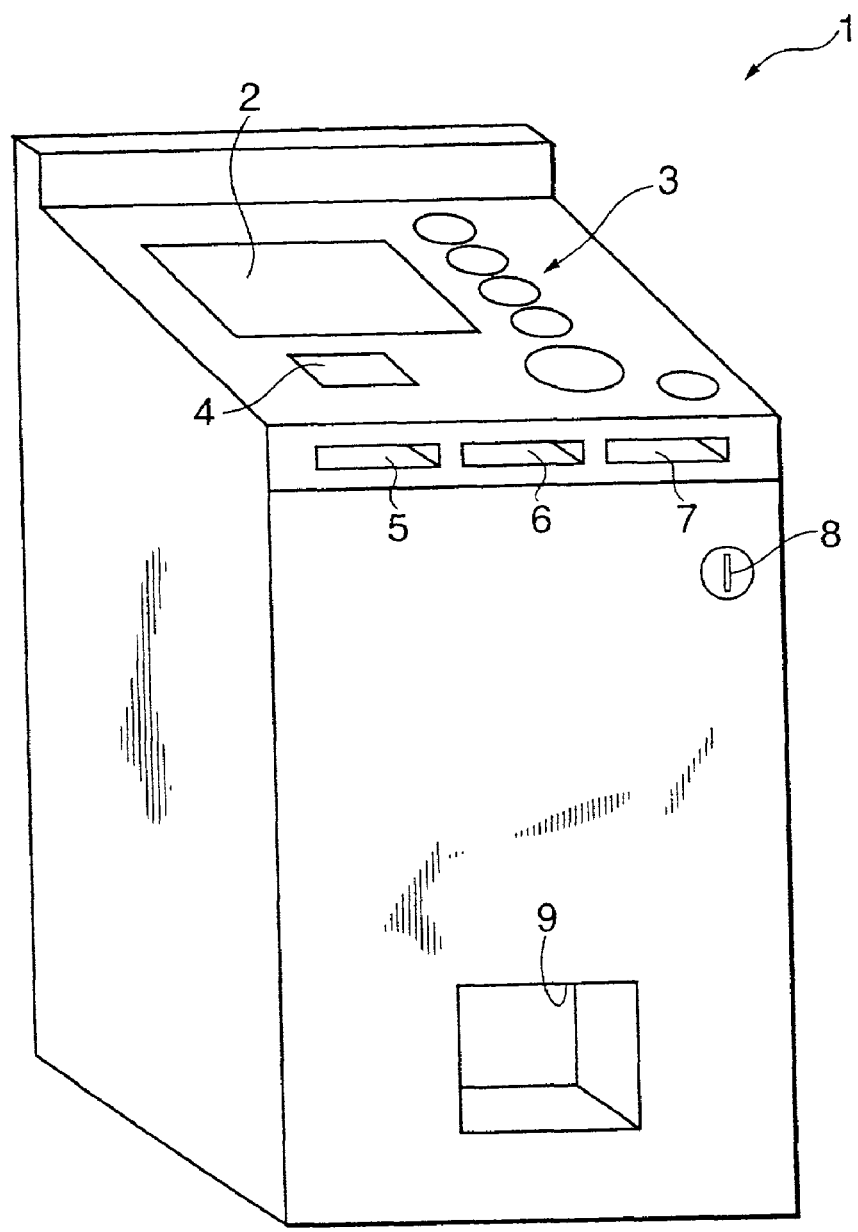
FIG. 1 is a perspective view showing the external appearance of a print system according to a first embodiment of the present invention.

FIG. 1 illustrates the external appearance of a print system 1 according to this embodiment of the present invention.

The print system 1 printing an image on paper (a visible recording medium). The image is represented by image data that has been recorded on a medium such as a floppy disk, CD (Compact Disk) or memory card.

The print system 1 according to this embodiment prints an image on paper and is also capable of printing a bar code, which is for identifying a user, on part of the paper. The paper on which the image has been printed is held inside the print system 1. Further, a bar code identical with a bar code that has been printed on paper together with an image is printed on a sheet of paper other than that on which the image is printed and this other sheet of paper is ejected from an ejection port 9. The user accepts the paper on which the bar code has been printed. By subsequently having the print system 1 read the ejected bar code, the print corresponding to this bar code is ejected from the print system 1. Thus, the paper on which the image has been printed can be received, without risk of theft by a third party, upon elapse of a fixed period of time following end of printing.

Further, the print system 1 according to this embodiment is such that in response to entry of a user contact destination, the system will, upon completion of printing of an image, contact the destination to report end of printing. This means that the user need not remain near the print system 1 until printing ends. This allows the user to leave the location of the print system 1 and complete other tasks during printing.

The details of operation of the print system 1 will become apparent from the description that follows.

The user of the print system 1 stands in front of the system to operate the same.

Formed on the front side of the print system 1 at the top thereof are a floppy-disk slot 5 for inserting a floppy disk, a CD slot 6 for loading a CD and a memory-card slot 7 for loading a memory card. A coin inserting slot 8 for inserting a fee to use the print system 1 is formed below the memory-card slot 7. An ejection port 9 for ejecting paper that has been printed on is formed on the front side of the print system 1 at the lower end thereof.

The top side of the print system 1 is provided with a display screen 2 for displaying characters and images, etc. A reading screen 4 of a bar-code reader for reading a bar code, in a manner described later, is formed in front of the display screen 2. Various keys 3 by which the user applies commands are provided on the right side of the display screen 2.

Figure 2:
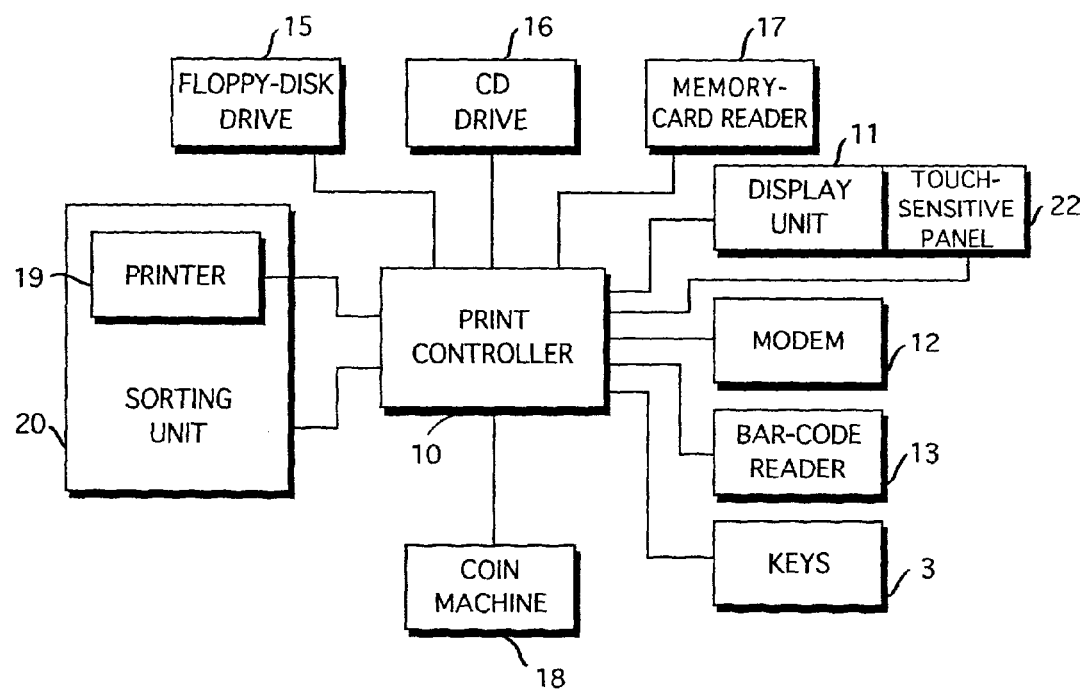
FIG. 2 is a block diagram showing the electrical construction of this print system.

FIG. 2 is a block diagram illustrating the electrical construction of the print system 1.

The overall operation of the print system 1 is controlled by a print controller 10.

The print system 1 includes a display unit 11 having the display screen 2. A touch-sensitive panel 22 is formed on the display screen 2 of the display unit 11. A signal indicating that the touch-sensitive panel 22 has been touched is input to the print controller 10. The print system 1 further includes a modem 12 for communicating with a communication device via a communication channel, and a bar-code reader 13 having the bar-code reading screen 4. The system includes the various keys 3, as mentioned above. Signals representing commands from these keys 3 are input to the print controller 10.

The print system 1 further includes a floppy-disk drive 15 for reading image data that has been recorded on a floppy disk loaded in the floppy-disk slot 5, a CD drive 16 for reading image data that has been recorded on a CD loaded in the CD slot 6, and a memory-card reader 17 for reading image data that has been recorded on a memory card loaded in the memory-card slot 7.

The print system 1 includes a coin machine 18 for executing predetermined processing to check coins inserted from the coin inserting slot 8 and to calculate change, etc. The print system 1 further includes a printer 19 for printing images and bar codes and a sorting unit 20 for sorting sheets of paper, on which images have been printed, based upon bar codes.

Figure 3:
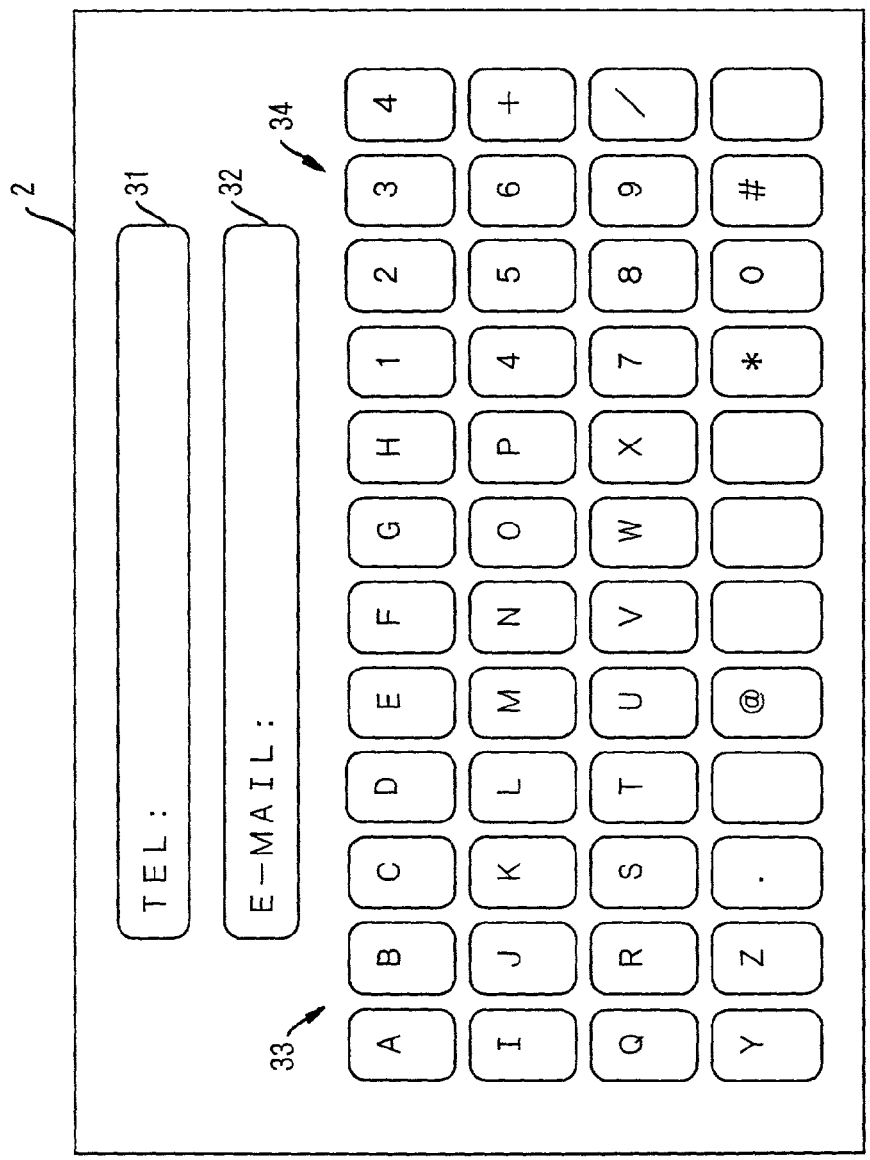
FIG. 3 illustrates an example of a display screen.

FIG. 3 illustrates an example of the display screen 2 of print system 1.

The display screen 2 is an image for entering a telephone number and an e-mail address as contact destinations, as mentioned above.

The destination-contact input image includes an area 31 for displaying an entered telephone number, an area 32 for displaying an entered e-mail address, an area 33 in which letters of the alphabet are displayed, and an area 34 in which numerals are displayed. The letters of the alphabet are entered by touching the alphabetic characters being displayed in the area 33 of display screen 2. Numerals are entered by touching the numerals being displayed in the area 34 of display screen 2.

When a telephone number is entered, for example, the area 31 is touched. This enables input of a telephone number. The telephone number, which is entered by touching the numerals displayed in the area 34, is displayed in the area 31. Further, when an e-mail address is input, the area 32 is touched. This enables input of an e-mail address. The e-mail address, which is entered by touching alphabetic characters displayed in the area 33 or numerals in the area 34, is displayed in the area 32.

Figure 4:
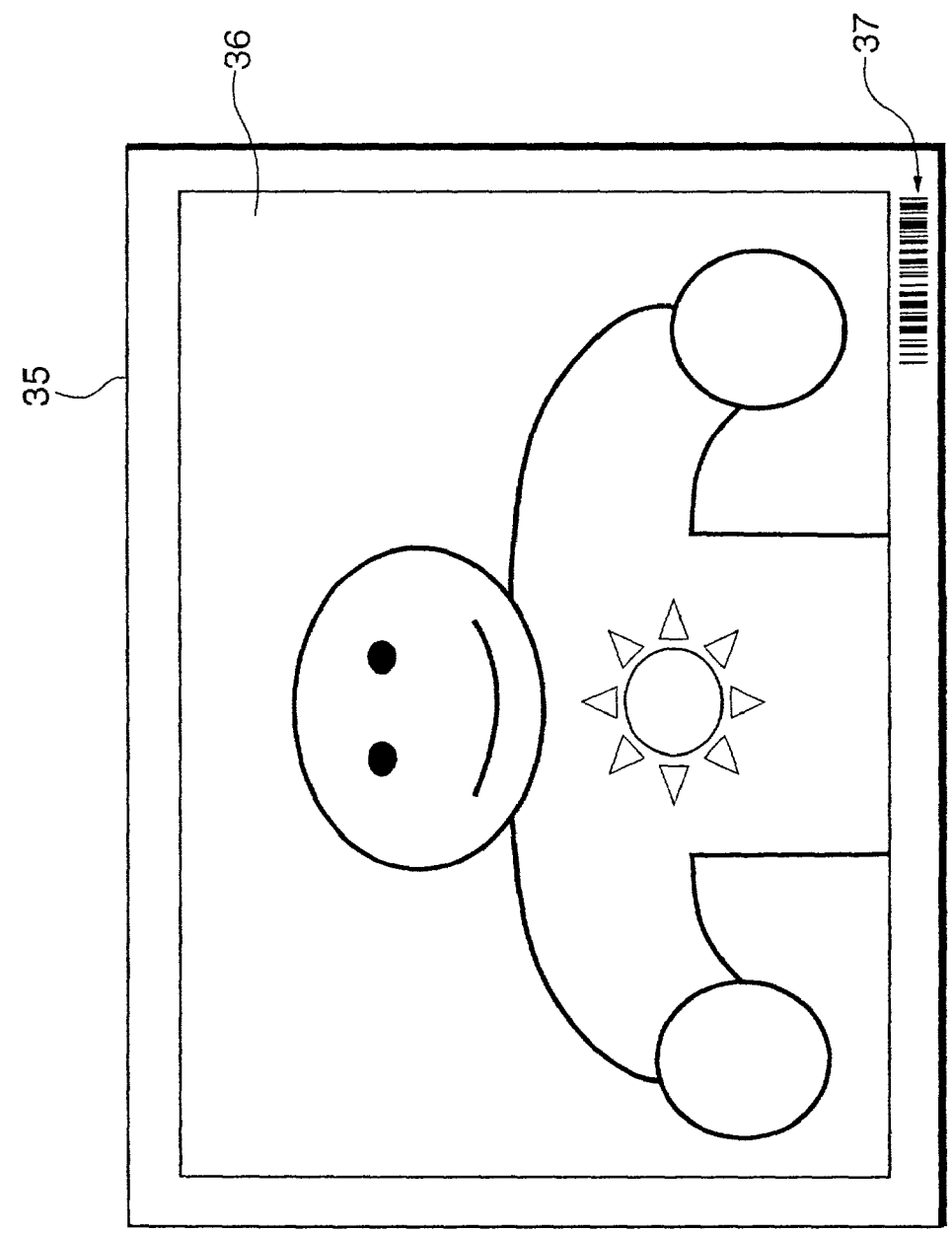
FIG. 4 illustrates an example of a sheet of paper on which an image has been printed.

FIG. 4 illustrates an example of paper 35 on which an image has been printed by the print system 1.

An image display area 36 is formed over substantially the entire surface of the paper 35. An image represented by image data that has been recorded on a medium loaded in the print system 1 is printed in the image display area 36.

A bar-code display area 37 is formed at the lower right of the paper. A bar code for identifying the user, as mentioned above, is printed in the area 37.

Figure 5:
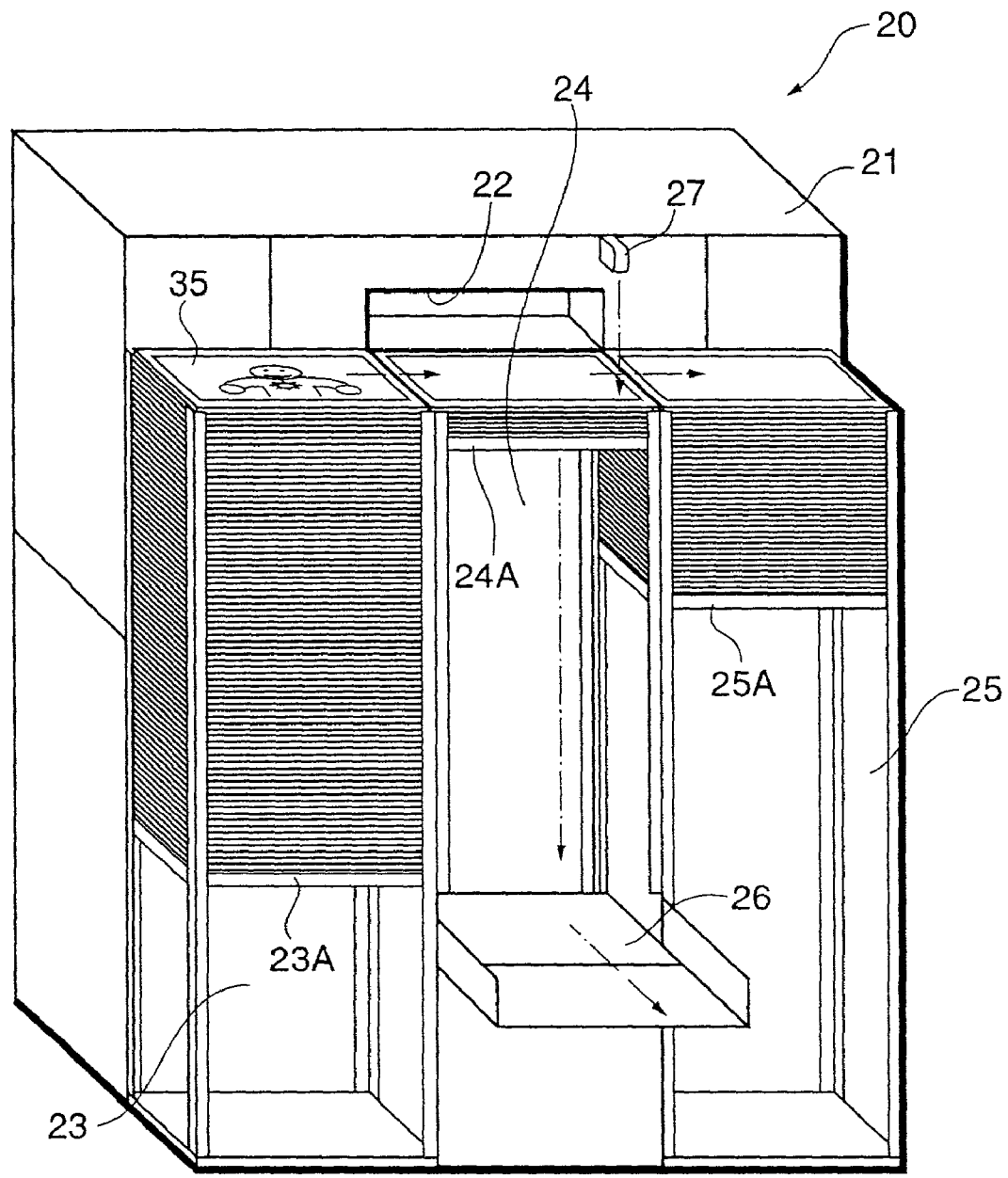
FIG. 5 is a perspective view showing a sorting unit.

FIG. 5 illustrates a sorting unit 20 incorporated within the print system 1.

The sorting unit 20 includes a case 21 incorporating the printer 19. The front side of the case 21 near the top thereof is formed to have an ejection port 22 at the center of the front side. The paper 35 on which an image and bar code have been printed by the printer 19 is ejected to the outside of the case 21 from the ejection port 22.

The front side of the case 21 is provided with a left stack 23, a center stack 24 and a right stack 25. The left, center and right stacks 23, 24 and 25 all hold sheets of paper 35 on which images and bar codes have been printed. A mechanism (not shown) for moving the sheets 35 to the left or right is provided in such a manner that the sheets 35, which are held in each of the left, center and right stacks 23, 24 and 25, can be moved to another stack. The left, center and right stacks 23, 24 and 25 include pedestals 23A, 24A and 25A, respectively, capable of being raised and lowered freely. The center stack 24 is formed to have a tray 26 at its lower end.

A bar-code sensor 27 in which the bar-code reader 13 is incorporated is provided on the front side of the case 21 above the ejection port 22. The bar-code sensor 27 senses the content of a bar code printed on the paper 35.

Sheets of the paper 35 on which images and bar codes have been printed by the printer 19 are ejected from the ejection port 22 and are collected in the center stack 24. The paper 35 collected in the center stack 24 is then moved to the left stack 23 or right stack 25.

When paper on which a bar code has been printed is placed on the bar-code reading screen 4 by the user, the content of the bar code is read by the bar-code reader 13. When this is done, the sheets of paper 35 that have been collected in the left stack 23 are moved to the center stack 24 one sheet at a time. The bar codes that have been printed on the paper 35 are read by the bar-code sensor 27. Paper 35 on which has been printed a bar code whose content is identical with that of a bar code read by the bar-code reader 13 is collected in the center stack 24. Paper 35 on which has been printed a bar code whose content is different from that of a bar code read by the bar-code reader 13 is not collected in center stack 24 but is moved to, say, the right stack 25. Paper 35 having a bar code whose content is identical with that of a bar code placed on the bar-code reading screen 4 by the user is collected in the center stack 24.

When all sheets of paper 35 having a bar code whose content is identical with that of a bar code placed on the bar-code reading screen 4 by the user have been collected in the center stack 24, the pedestal 24A of the center stack 24 is lowered, whereupon the paper 35 stacked on the pedestal 24A of the center stack 24 is ejected from the tray 26. The paper 35 ejected from the tray 26 is ejected from the ejection port 9 of the print system 1.

Figure 6:
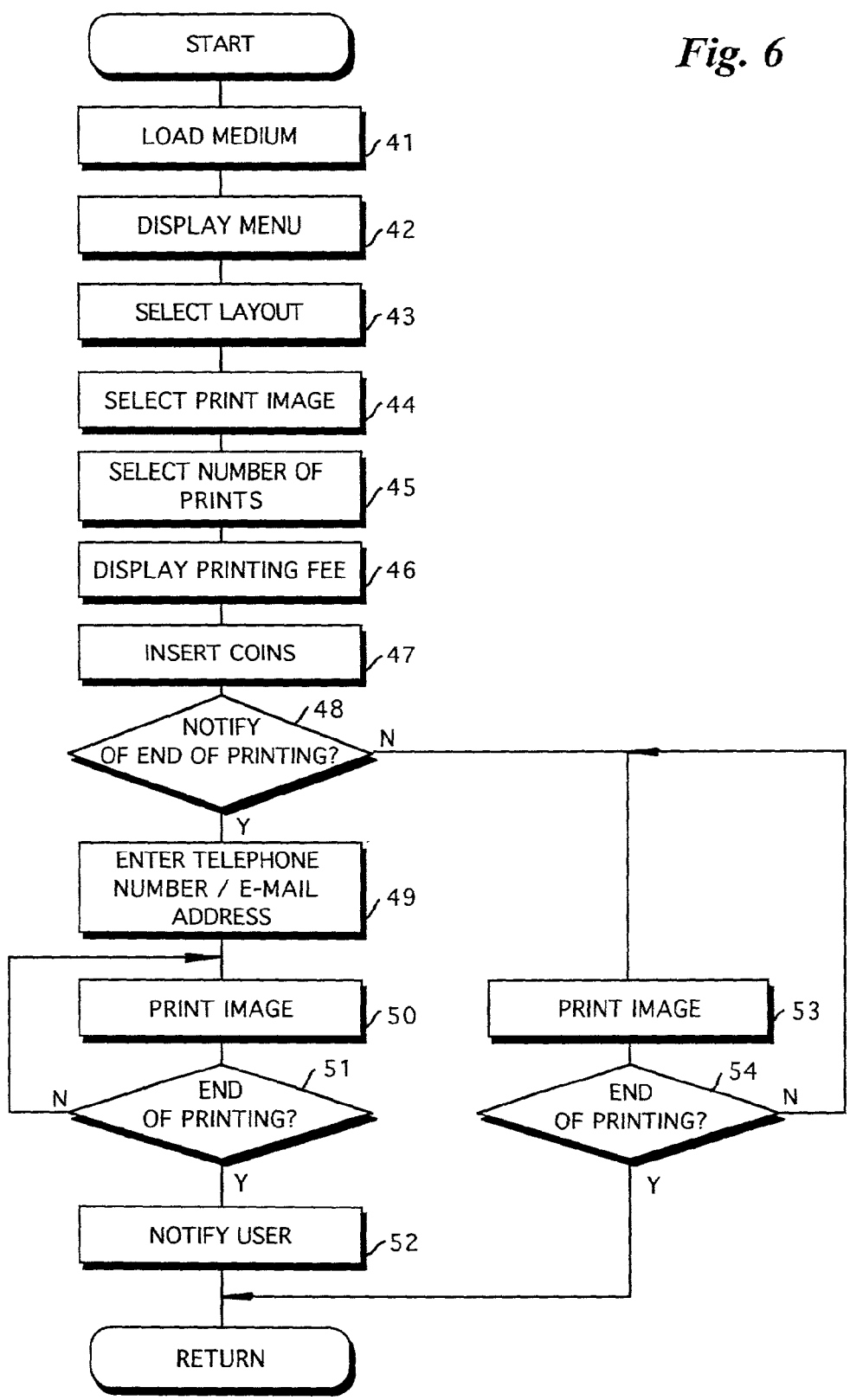
FIG. 6 is a flowchart illustrating processing executed by the print system according to the first embodiment.

FIG. 6 is a flowchart illustrating the processing executed by the print system 1.

A medium on which image data representing an image to be printed is loaded in the corresponding slot among the floppy-disk slot 5, CD slot 6 and memory-card slot 7 (step 41), whereupon a menu image is displayed on the display screen 2 (step 42). On the basis of the menu image, the user selects whether or not to be notified when printing of an image by the print system 1 is finished. Further, sample images of a plurality of layouts appear on the display screen 2 and the user selects a desired layout from among the sample images of the plurality of layouts (step 43). Furthermore, images represented by image data that has been recorded on the loaded medium are displayed in list form and the image to be printed is selected from among the images displayed in the list (step 44). The number of prints to be made is entered using the various keys 3 (step 45).

The printing fee is calculated based upon the number of prints entered by the user and the fee is displayed on the display screen 2 (step 46). Coins of an amount corresponding to the fee displayed on the display screen 2 are inserted by the user from the coin inserting slot 8 (step 47).

If the system has been configured by the user to notify of end of printing ("YES" at step 48), then the contact-destination input image shown in FIG. 3 is displayed on the display screen 2. Utilizing the contact-destination input image, the user enters a telephone number or e-mail address serving as the destination to be contacted when printing ends (step 49). Of course, both a telephone number and an e-mail address may be entered. If the contact destination is entered by the user, then printing of the designated image starts (step 50). When printing ends, the entered contact destination is so notified. This means that no constraint is imposed upon the user by the time needed for printing to end.

When printing ends ("YES" at step 51), the communication device (cellular telephone, installed telephone, personal computer, etc.) of the contact destination specified by the entered telephone number or e-mail address is so notified using the modem 12 (step 52). If the contact destination is a telephone number, for example, a message indicative of end of printing would be recorded in advance and sound data representing this message would be transmitted from the print system 1 to the user's telephone. By answering the telephone, the user can hear the message indicating the end of printing and thereby determine that printing has ended. If the contact destination is an e-mail address, data indicating that printing has ended is transmitted from the print system 1 to a mail server. The mail server transmits e-mail to the personal computer of the user who, by viewing the e-mail, learns that printing has ended. The user may be notified of end of printing by utilizing short-distance communication, as will be described later.

If the system has not been configured to notify of end of printing ("NO" at step 48), then printing of images is carried out until the printing of all images is completed (steps 53, 54). The user is not notified of end of printing.

Figure 7:
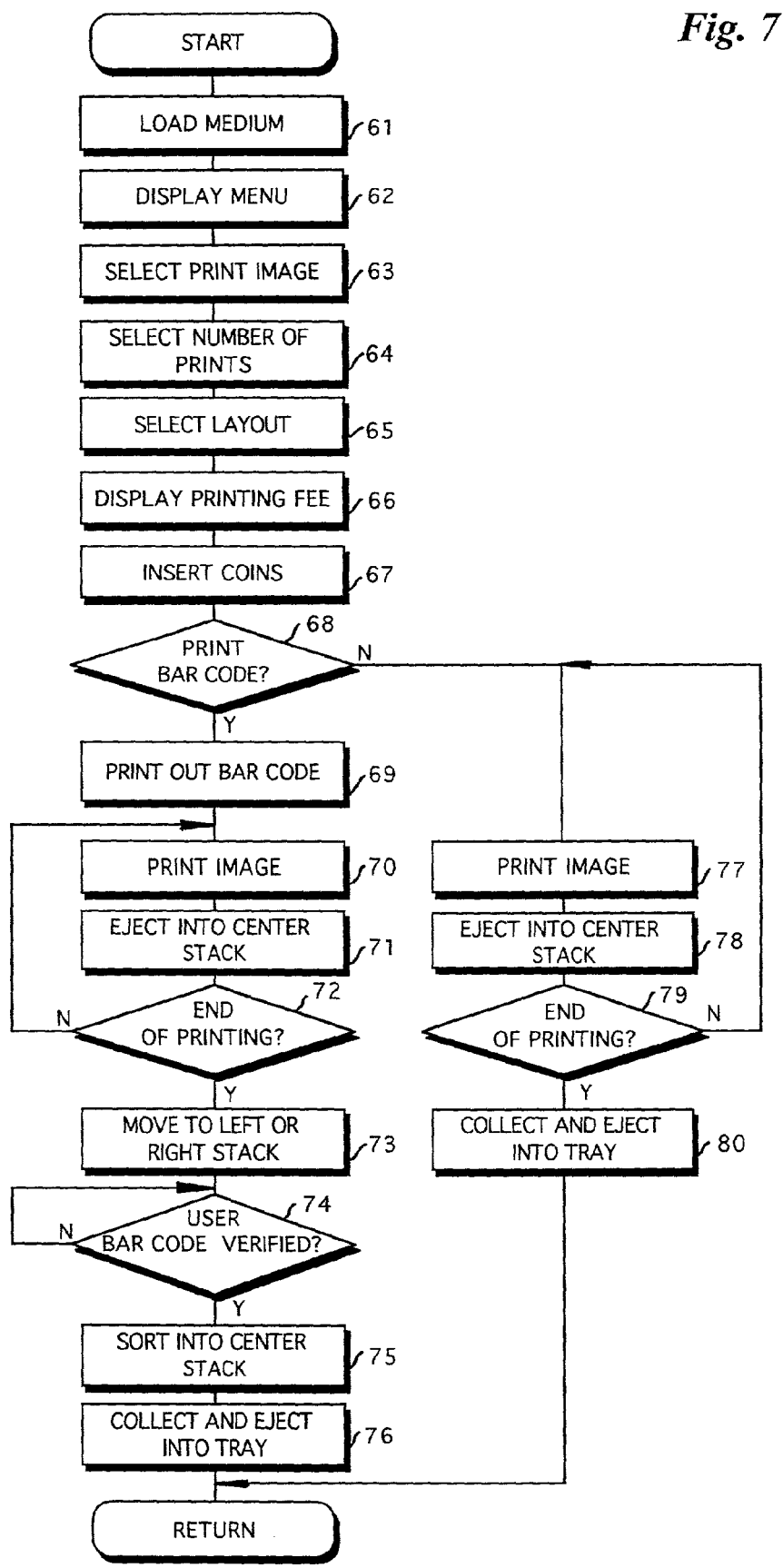
FIG. 7 is a flowchart illustrating another example of processing executed by the print system.

FIG. 7 is a flowchart illustrating processing executed by the print system 1 according to another embodiment.

According to this embodiment, a bar code is printed together with an image and the bar code is read, whereby the print corresponding to the bar code is released from the print system 1.

In a manner similar to that described above, a medium on which image data has been stored is loaded in the print system 1 (step 61) and a menu is displayed (step 62). Whether a bar code is to be printed or not is set using the menu display.

Next, the image to be printed is selected (step 63). The number of prints is selected (step 64), the layout is selected (step 65) and the amount of payment for printing is displayed (step 66). If coins equivalent to the printing fee are inserted from the coin inserting slot 8, it is determined whether the system has been configured to print a bar code (step 68).

If the system has been configured to print a bar code ("YES" at step 68), the bar code for identifying the user is printed by the printer 19, as described above. A sheet of paper having the printed bar code is ejected from the ejection port 9 and delivered to the user. A bar code identical with the bar code that has been printed on the paper ejected from the ejection port 9 is printed on paper together with an image (step 70). Paper thus printed on is collected in the center stack 24 of the sorting unit 20 in the manner described above (step 71). If printing ends ("YES" at step 72), the paper on which printing has been performed is moved to whichever of the left or right stacks 23, 25 printed images have already been collected in (step 73). Accordingly, either of the left or right stacks 23, 25 is empty.

The user subsequently returns to the location at which the print system has been installed and the user places the sheet of bar-code paper on the bar-code reading screen 4. In response to the bar code of the user being recognized by the bar-code reader 13 ("YES" at step 74), sheets of paper 35 on which has been printed a bar code corresponding to the recognized bar code are sorted into the center stack 24, in the manner described above, from among the sheets of paper 35 on which images have been printed and which are being held in the sorting unit 20 of the print system 1 (step 75). The sorted sheets of paper 35 are ejected to the exterior of the print system 1 from the ejection port 9 via the tray 26 (step 76).

Thus, the user can leave the location of the print system 1 even though the printing of images is not finished. Paper 35 on which an image has been printed cannot be extracted from the print system 1 unless the print system 1 is made to recognize the corresponding bar code. Hence there is no danger of theft by a third party. Furthermore, rather than sorting printed sheets of paper by user in advance, the paper 35 is classified when the corresponding bar code is recognized. This means that a smaller number of stacks suffices.

If the system has not been configured to print a bar code ("NO" at step 68), then the image is printed without printing the bar code (step 77). Sheets of paper 35 on which images have been printed are collected in the center stack 24 (step 78). If printing is completed ("YES" at step 79), the sheets of paper 35 on which images have been printed are ejected from the ejection port 9 via the tray 26 (step 80).

In the above-described embodiment, processing for giving notification of end of printing (the processing of FIG. 6) is separate from processing for printing a bar code (the processing of FIG. 7). However, an arrangement may be adopted in which the same print system 1 executes both the processing for giving notification of end of printing and the processing for printing a bar code.

(2) Second Embodiment

A second embodiment of the present invention utilizes short-distance communication such as Bluetooth communication to transmit image data that is to be printed and to give notification of end of printing. Of course, image data need not be applied to the print system utilizing short-distance communication.

Figure 8:
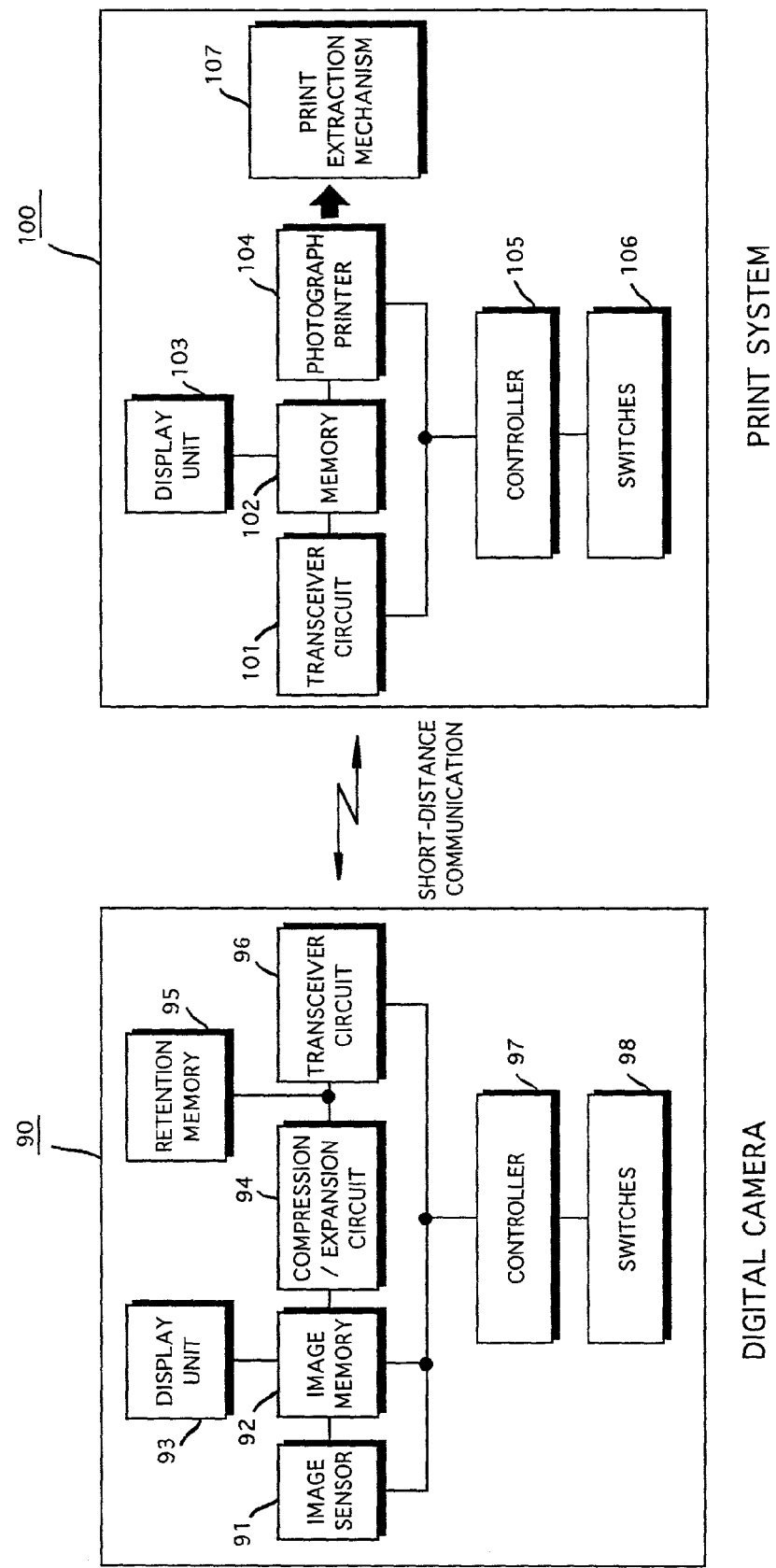
FIG. 8 is a block diagram showing the electrical construction of a digital camera and print system according to a second embodiment of the present invention.

FIG. 8 is a block diagram illustrating the electrical construction of a digital camera 90 and print system 100 that are capable of short-distance communication with each other.

The overall operation of the digital camera 90 is controlled by a controller 97.

The digital camera 90 is provided with switches 98 for setting modes such as an imaging mode, playback mode and communication mode and for designating images. Signals such as a mode setting signal from the switches 98 are input to the controller 97.

In the imaging mode, the image of a subject is sensed by an image sensing circuit 91 and image data representing the image of the subject is obtained. The image data is applied to a display unit 93 via an image memory 92.

If a shutter-release button included among the switches 98 is pressed, image data output from the image sensing circuit 91 is stored temporarily in the image memory 92. The image data is read out of the image memory 92 and is compressed in a compression/expansion circuit 94. The compressed image data is recorded on a retention memory (memory card) 95.

In the playback mode, image data that has been recorded on the memory 95 is read out and expanded in the compression/expansion circuit 94. The expanded image data is applied to the display unit 93 via the image memory 92. Thus, an image represented by the image data recorded in the memory 95 is displayed.

When image data is transmitted to the print system 100 in the communication mode, compressed image data is read out of the memory 95 and is applied to a transceiver circuit 96. The data is transmitted from the transceiver circuit 96 to the print system 100 by short-distance communication. Since compressed image data is transmitted to the print system 100, transmission time is shortened. Of course, it is required that the print system 100 have a function for expanding the compressed image data. An arrangement may be adopted in which the compression/expansion circuit 94 of the digital camera 90 expands the image data and transmits the expanded image data to the print system 100. Since the image data has been expanded, transmission time is prolonged but the print system 100 need not have an expansion function. It goes without saying that in a case where data is communicated between the digital camera 90 and the print system 100, the system would be configured for short-distance communication.

The overall operation of the print system 100 is controlled by a controller 105.

The print system 100 includes switches 106 for making various settings, an example of which is destination of an image to be printed. Setting signals from the switches 106 are input to the controller 105.

Image data that has been transmitted from the digital camera 90 by short-distance communication in the manner mentioned above is received by a transceiver circuit 101. The image data received is stored temporarily in a memory 102.

If the received image data has been compressed, the data is applied to the controller 105 and is expanded. The expanded data is stored in the memory 102 again. The expanded image data is read out of the memory 102 and is applied to a display unit 103. If the received image data has not been compressed, then the image data is read out of the memory 102 and is applied to the display unit 103. An image represented by the image data that has been transmitted from the digital camera 90 is displayed on the display screen of the display unit 103.

Image data read out of the memory 102 is applied also to a photograph printer 104. The latter prints an image represented by the image data that has been transmitted from the digital camera 90.

The print produced as an output by the photograph printer 104 is applied to a print extraction mechanism 107 having a shutter (not shown). If it judged that the user is authorized to acquire the print, then the shutter of the print extraction mechanism is opened so that the user can take delivery of the print, as will be described later.

Figure 9:
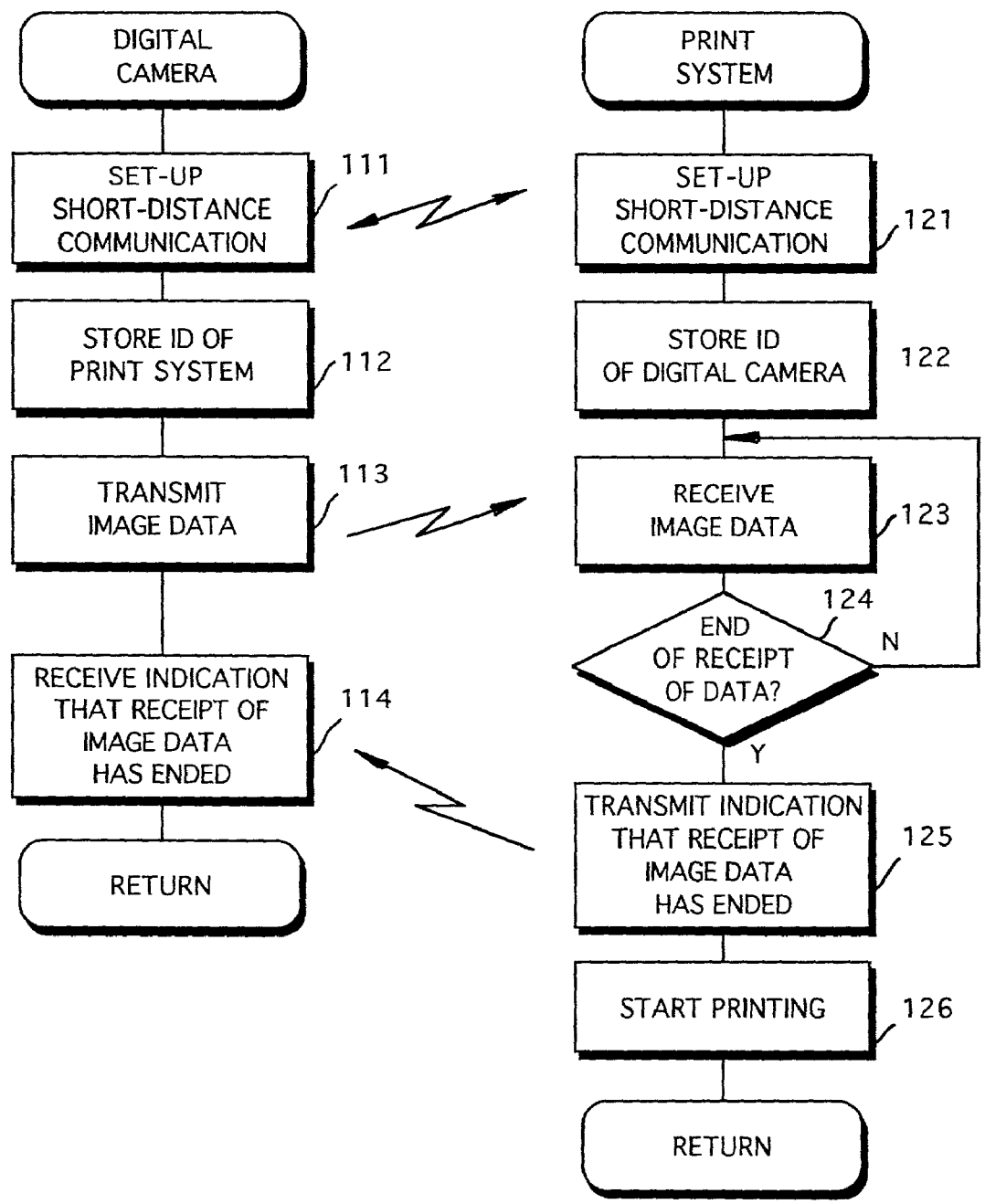
FIG. 9 is a flowchart illustrating processing executed when a print is ordered.

FIG. 9 is a flowchart illustrating processing executed by the digital camera 90 and print system 100 when a print is ordered.

First, short-distance communication is set up between the digital camera 90 and the print system 100 (steps 111, 121). In setting up short-distance communication, IDs are communicated mutually and the IDs are stored. More specifically, the ID of the print system 100 is stored in the digital camera 90 (step 112) and the ID of the digital camera 90 is stored in the print system 100 (step 122).

When this has been accomplished, image data is transmitted from the digital camera 90 to the print system 100 (step 113).

The image data transmitted from the digital camera 90 as set forth above is received by the print system 100 (step 123). If all image data has been finished being received ("YES" at step 124), then data indicating end of receipt of the image data is transmitted from the print system 100 to the digital camera 90 by short-distance communication (step 125).

The data indicating end of receipt of the image data transmitted from the print system 100 is received by the digital camera 90 (step 114). Owing to display of end of receipt of the image data on the display screen of the display unit 93 in the digital camera 90, the user of the digital camera 90 can ascertain that transmission of the image data has ended.

If receipt of image data transmitted from the digital camera 90 ends, the received image data is applied to the photograph printer 104 in the print system 100 and printing starts (step 126).

Figure 10:
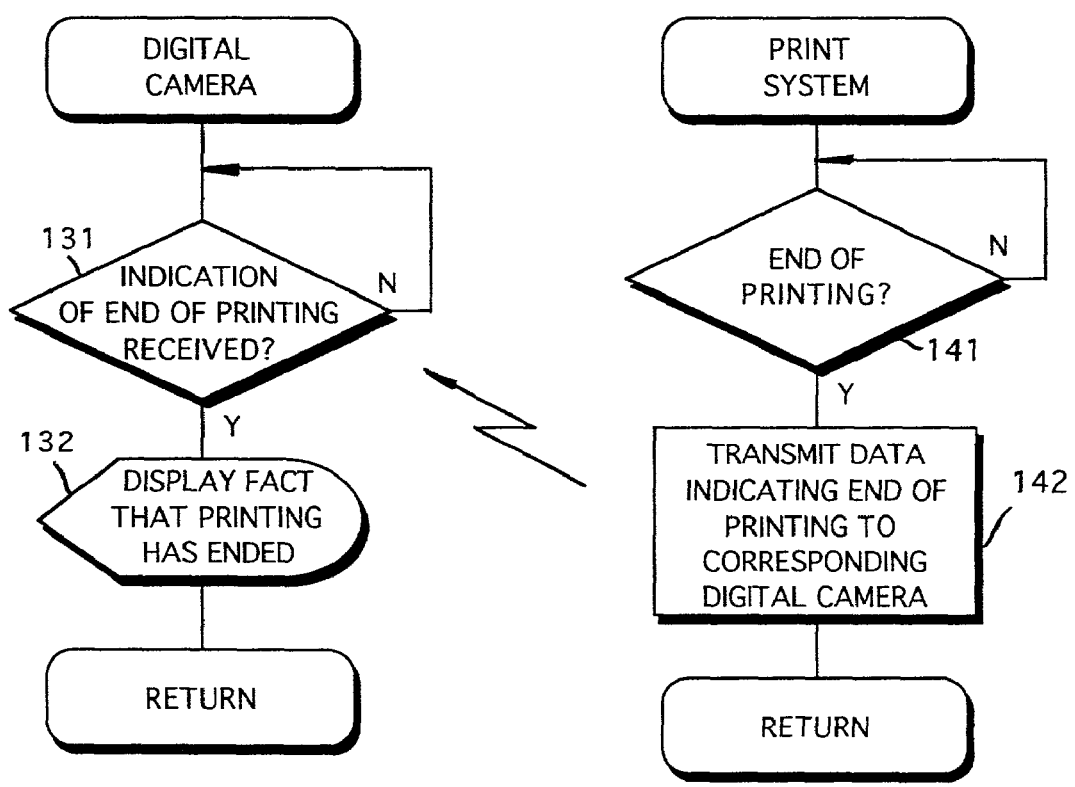
FIG. 10 is a flowchart illustrating processing executed when notification is given of end of printing.

FIG. 10 is a flowchart illustrating processing executed by the digital camera 90 and print system 100 when notification of end of printing is given.

If printing of all images represented by image data transmitted from the digital camera 90 is completed by the print system 100 (step 141), then data indicating end of printing is transmitted by short-distance communication to the digital camera corresponding to the digital-camera ID that has been stored (step 142).

If the data indicating end of printing transmitted from the print system 100 is received by the digital camera 90 ("YES" at step 131), then the fact that printing has ended is displayed on the display screen of the display unit 93 (step 132).

When printing ends, this fact is displayed on the display screen of the display unit 93 of digital camera 90. The user therefore can tell that printing has ended even if the user is not in the vicinity of the print system 100. In a case where the print system 100 is installed in a convenience store or the like, the user can proceed with shopping without being concerned with when printing will end. The end of printing may be reported by voice or vibration rather than by a display on the display unit 93.

Figure 11:
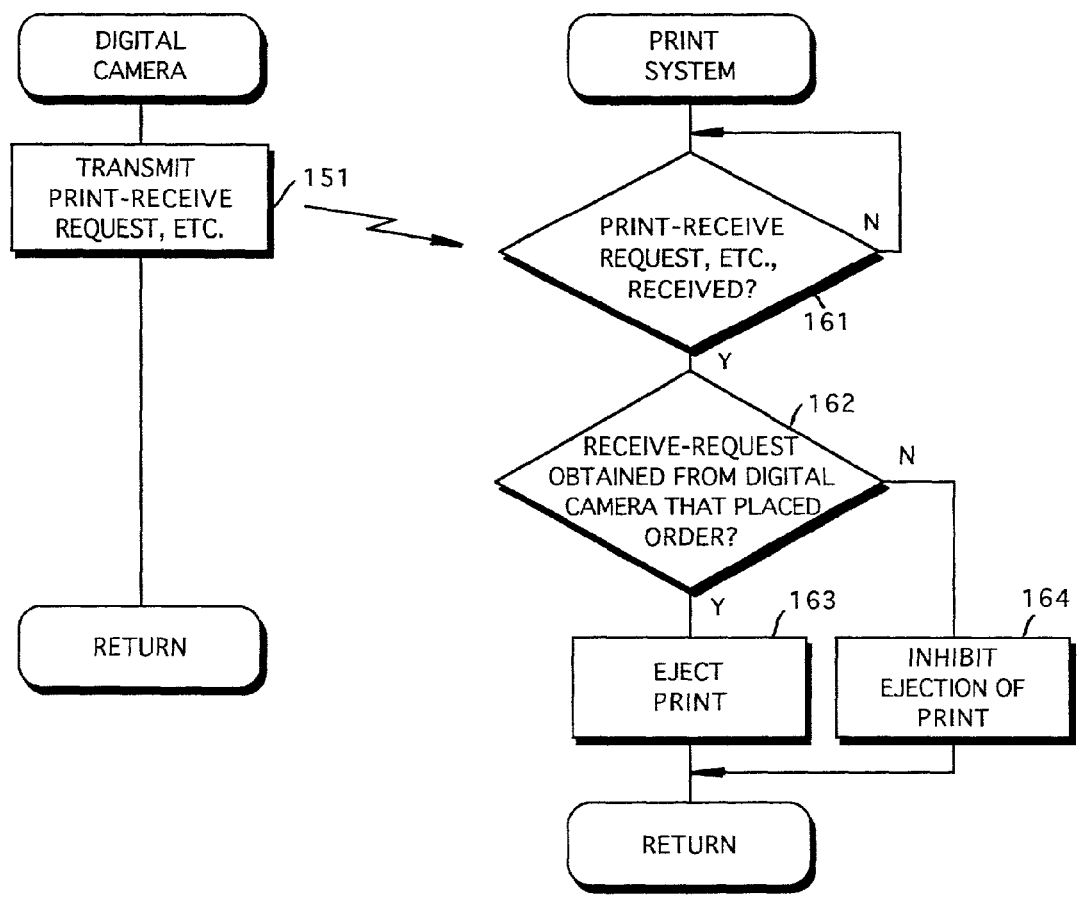
FIG. 11 is a flowchart illustrating processing executed when a print is received.

FIG. 11 is a flowchart illustrating processing executed by the digital camera 90 and print system 100 when a print is received.

Upon learning that printing has ended, the user operates the digital camera 90 to transmit data, which indicates a request to receive a print, to the print system 100 together with data indicating the ID of the digital camera 90 (step 151).

When data indicating a request to receive a print and data indicating the ID of the digital camera 90 is received by the print system 100 ("YES" at step 161), the system checks to determine whether the digital camera 90 that transmitted the data indicating the request to receive a print is the same as the digital camera that placed the order (step 162).

If the ID transmitted from the digital camera 90 matches an ID already stored, then the system judges that the data indicating the receive request was transmitted from the digital camera that placed the order ("YES" at step 162). Since it is considered that the user has the privilege to take delivery of the print, the print is ejected from the print extraction mechanism 107 (step 163). If the ID transmitted from the digital camera 90 does not match an ID already stored, then it is judged that the data indicating the receive request was transmitted from a digital camera different from the digital camera that placed the order ("NO" at step 162). In order to prevent the print from being delivered to a user different from the orderer, the shutter of the print extraction mechanism 107 is closed to inhibit ejection of the print (step 164).

Thus, a print can be delivered to the correct recipient. Since a print will not be delivered to a user different from the correct recipient, there is no danger that a person other than the correct recipient will see the printed image.

As many apparently widely different embodiments of the present invention can be made without departing from the spirit and scope thereof, it is to be understood that the invention is not limited to the specific embodiments thereof except as defined in the appended claims.

What is claimed is:

1. A print system comprising:
   a housing;
   an input unit on the housing for inputting a contact destination to be contacted at end of printing;
   a printer in the housing for printing an image on a visible recording medium;
   a first determination unit for determining whether printing by said printer has ended; and
   a transmitting unit, which is responsive to a determination by said determination unit that printing has ended, for transmitting data indicating that printing has ended to a data processing unit outside the housing and specified by the contact destination input by said input unit, via a communication channel,
   wherein said data processing unit is capable of short-distance communication with said print system;
   said input unit receives identification data, which identifies said data processing unit, as the contact destination transmitted from said data processing unit by short-distance communication; and
   the transmitting unit transmits the data indicating that printing has ended to said data processing unit, which is identified by the identification data, by short-distance communication,
   said print system further comprising image data receiving unit for receiving image data transmitted from said data processing unit by short-distance communication;
   wherein said printer records an image represented by the image data, which has been received by said image-data receiving unit, on a visible recording medium,
   said print system further comprising:
   a request data receiving unit for receiving data indicating an extraction request for a given print transmitted from said data processing unit by short-distance communication;
   a second determination unit for determining, in accordance with receipt of the extraction request data by said request data receiving unit, whether the data processing unit that transmitted the extraction request data is that of a user authorized to acquire the given print; and
   a printer control unit for ejecting a visible recording medium, on which printing has been performed by said printer, in response to a determination by said second determination unit that the user is authorized to acquire the given print.

* * * * *